Nov. 3, 1931.    W. E. SLOAN    1,830,005
FLUSH VALVE
Filed April 9, 1927

Inventor
William E. Sloan
By Parker & Carter Attys

Patented Nov. 3, 1931

1,830,005

UNITED STATES PATENT OFFICE

WILLIAM E. SLOAN, OF CHICAGO, ILLINOIS

FLUSH VALVE

Application filed April 9, 1927. Serial No. 182,519.

This invention relates to flush valves and has for its object to provide a new and improved valve of this description.

The invention has as a further object to provide a flush valve having a by-pass which is positively opened when the valve is actuated.

The invention has as a further object to provide a flush valve which can be easily assembled and wherein the packing on the piston will be kept in proper position.

The invention has as a further object to provide a flush valve in which the portion of the casing in which the piston of the valve works, is pressed down upon the piston in assembling so as not to interfere with the packing member of the piston.

The invention has further objects which are more particularly pointed out in the accompanying description.

Referring now to the drawings, Fig. 1 is a sectional view through one form of valve embodying the invention.

Figure 1:
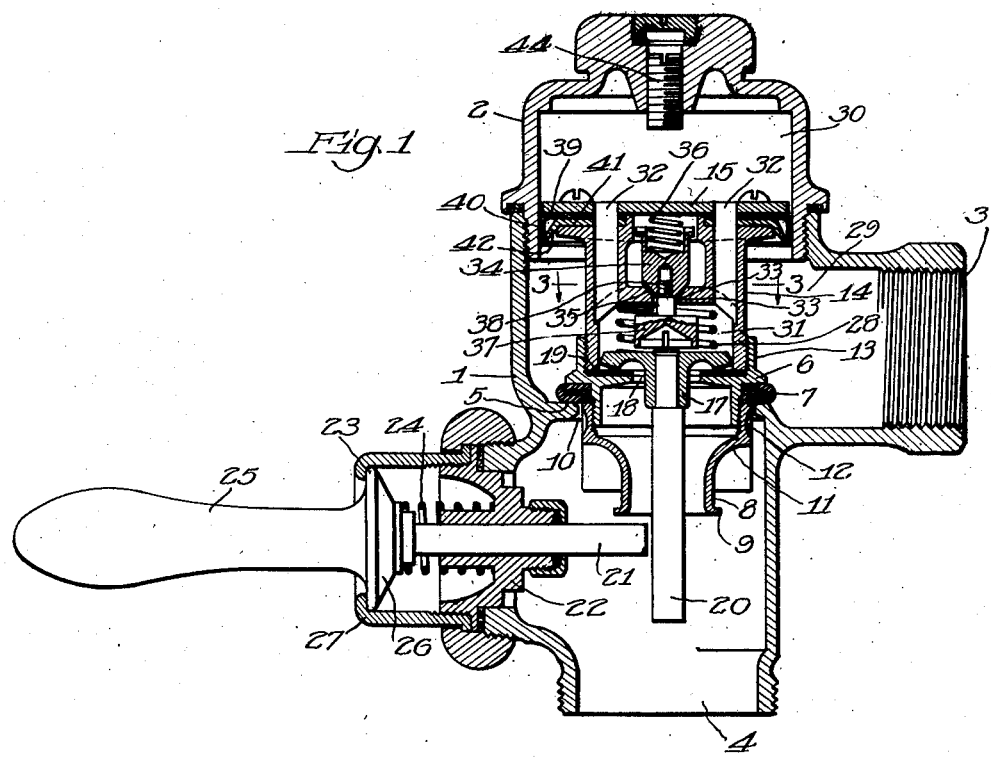

Like numerals refer to like parts throughout the several figures. Referring to the construction shown, I have shown a valve with a casing made up of the two sections 1 and 2 removably connected together. The section 1 is provided with an inlet 3 and an outlet 4. Within the section 1 is a valve seat 5. A main valve 6 controls the passage of the water that enters the casing and is provided with a seating portion 7 which engages the seat 5 when the valve is closed, as shown in Fig. 1. This seating portion is preferably non-metallic. It is herein shown as made of rubber. The main valve 6 is provided with a downwardly projecting, hollow portion 8 which is provided at its end with a laterally projecting part 9. When the water is flowing through the valve it strikes this laterally projecting portion or flange and helps to close the valve, that is, it insures its closing. The valve seat 5 is cut away at 10 and the cylindrical portion 11 of the main valve 6 is provided with the refill groove or grooves 12, the parts being arranged so that as the main valve closes the cylindrical portion 11 will pass by the valve seat thus closing off the water but as the refill grooves come opposite the valve seat, a small amount of water will pass the valve and the velocity of this water will be such that it will remain in the bowl so as to refill it the proper amount.

Figure 2:
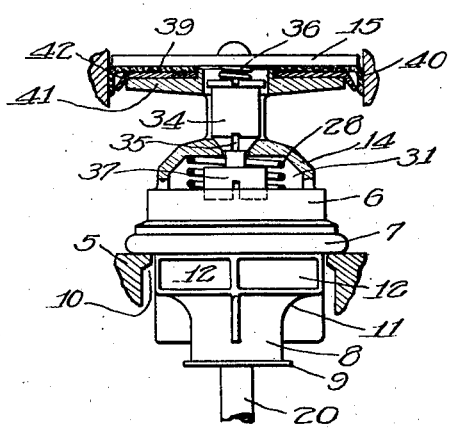
Fig. 2 is a view in part section showing the piston and the main valve.
Figure 3:
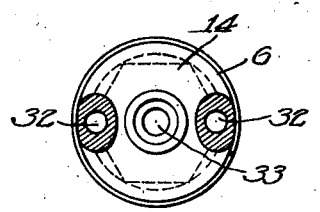
Fig. 3 is a sectional view taken on line 3—3 of Fig. 1.

The main valve 6 is provided at the top with a threaded ring 13. A member 14 with a threaded end engages the threaded ring 13. This member 14 is connected with the piston 15. The member 14 is enlarged at its lower end as shown in Fig. 2 and is hollow. An auxiliary valve 17 is located within the ring 13 and the member 14 and controls the opening 18 in the main valve. This auxiliary valve rests upon a non-metallic piece 19 which is shown as clamped against the valve by the member 14. Some means is provided for opening the auxiliary valve 17 to release the pressure above the piston 15 and permit the discharge of water above said piston in order that the pressure in the section 1 of the casing may open the valve.

In the construction shown, the auxiliary valve is opened by tilting it. Said auxiliary valve is provided with a projecting part 20 which projects through the opening 18. An actuating member located opposite the part 20 is arranged to be controlled from the outside of the casing and to move the part 20 to tilt the auxiliary valve.

In the construction shown, this actuating member 21 is slidably mounted in a part 22 attached to the section 1 of the casing and is provided with an enlarged end 23 and a retracting spring 24. A handle 25 is provided with an enlarged end 26, which engages the end 23. This handle projects from a removable cap 27 connected with the part 22. When the handle 25 is moved in any direction, it moves the actuating member forward to engage the part 20 and move the auxiliary valve 17 to open it. When the handle is released the retracting spring 27 moves the actuating member and associated parts to their initial positions.

The opening of the auxiliary valve causes the main valve to open as hereinafter explained and when the handle 23 is released the auxiliary valve 17 closes either by gravity or by a spring 28, (see Fig. 1). A by-pass connection is provided between the chamber 29 below the piston and the chamber 30 above the piston.

In the construction shown, the chamber 31 in the member 14 is connected by one or more passageways 32 with the chamber 30 and the chamber 30 is connected by the passageway 33 with the chamber 29. These passageways are all comparatively large so that there is no danger of them being stopped or obstructed by foreign matter. At the end of the passageway 33 is a movable by-pass member 34 provided with a by-pass 35 in the form of a groove in the seating face of the by-pass member. This by-pass member normally closes the passageway 33 except for the by-pass 35 which permits a small amount of water to pass from the chamber 29 through said by-pass 35 into the chamber 31 and thence through passageways 32 and into chamber 30 above the piston.

The movable by-pass member may seat itself of its own weight that is, by gravity or may be provided with a spring 36 to assist the seating thereof. Connected with the movable by-pass member 34 is an actuating part 37 connected therewith by a threaded connecting piece 38 which has a threaded engagement with the movable by-pass member 34. This actuating part 37 is in proximity to the auxiliary valve 17 and is arranged so that when the auxiliary valve is tilted, the actuating part 37 will be moved upwardly so as to move the by-pass member 34 upwardly away from its seat and permit the water to flow past it so as to insure the cleaning out of the by-pass. The piston 15 is provided with a flexible packing 39 which is shown in the form of a cup and which is made of leather or any other suitable material, the edge 40 of the packing being bent at an angle to the body portion and sliding along the inner face of the casing as the valve is moved.

Some means is provided for insuring the proper contact of the bent portion 40 with the casing so as to prevent leakage around the valve between the chambers 29 and 30. In the construction shown, this result is secured by means of a packing pressure member 41 connected with the piston. This packing pressure member may be made of any suitable material and is provided with a bent edge 42 which engages the bent portion 40 of the packing. I have secured good results by making this packing pressure member of molded rubber, molded with the edge turned at an angle to the body portion so that the edge inclines outwardly, the inclined, bent edge engaging the bent portion 29 of the packing. The parts are arranged so that the piston 15 moves in the section 2 of the casing throughout its movement. This permits the section 2 of the casing to be placed down upon the piston in assembling the parts so that in the assembling movement the relative movement of the piston and the casing tends to insure the proper position of the bent end 40 of the packing, as this relative movement tends to push the bent end of the packing downwardly.

It will thus be seen that there is no danger of having this bent end displaced, injured or crumpled during the assembling of the parts. A suitable adjusting means is provided for regulating the movement of the piston. As herein shown, I provide an adjusting device 44 connected with the section 2 of the casing which projects into the chamber 30 and which may be moved to project more or less into said chamber to regulate the movement of the piston.

The use and operation of my invention are as follows.

When the valve is in its closed position, the parts are in the position shown in Fig. 1. The inlet 3 is connected with a source of water supply and the outlet 4 with the bowl or other device in connection with which the device is used. The water in the chamber 29 has passed through the by-pass 35, chamber 31 and passageways 32, into the chamber 30 so that the pressures in the chambers 29 and 30 are such as to keep the main valve 6 closed. When it is desired to operate the valve, the handle is operated and the actuating member 21 moved to engage the part 20 and open the auxiliary valve 17. This permits the water from the chamber 30 to be discharged through passageways 32 and 18.

The pressure in chamber 30 is thus lowered and the pressure in chamber 29 on the bottom of the piston 15 lifts said piston and opens the main valve 6. The water is now discharged past the valve seat 5. The movement of the auxiliary valve causes it to engage the actuating part 37 and thus move the movable by-pass member 34 so as to lift it to increase the size of the by-pass opening and permit the water to flow through passageway 33 thus washing away any foreign matter from said passageway and from the by-pass 35. As long as the auxiliary valve is held open, the movable by-pass member will be held in a position where the by-pass opening is enlarged. When the handle is released, the auxiliary valve 17 closes so as to stop the discharge of the water from chamber 30. Water now passes from chamber 29 up to chamber 30 and moves the piston 15 so as to close the main valve 6. When the auxiliary valve closes, the movable by-pass member 34 is moved back to its seat so as to leave open only the by-pass 35, and the upper chamber is filled by the water passing through this by-pass.

It will be seen that by means of this device, the by-pass is enlarged positively every time the valve is operated and that this is done by operating the handle of the flush valve. When the movable by-pass member 34 is moved so as to be lifted from its seat, the by-pass will then consist of a three sided groove, the fourth side being open so that the washing out of any foreign matter is insured. As the main valve moves to its closed position, the water is shut off by the cylindrical part 11 when it reaches the valve seat 5 and as the valve moves farther downwardly, the refill groove or grooves 12 come opposite the valve seat and permit the proper amount of water to pass for securing the desired refill of the bowl. The water passing through the main valve, when it is open, strikes the projection 9 on said valve and insures the proper closing of the valve.

It will be noted that the section 2 of the casing projects inside of the section 1 and its lower end is below the piston 15 in all of its various positions. It will further be noted that in assembling the parts, the section 2 of the casing is moved downwardly along the packing member of the piston so as to prevent distortion or injury or crumpling of said packing member.

The packing pressure device engages the bent portion of the packing and insures its being kept in contact with the inner face of the casing so as to prevent leakage by the piston.

I claim:

1. A flush valve comprising a casing, a main valve therein, a movable part connected with said main valve which divides the casing into two chambers, a handle for operating the valve, a by-pass extending through said movable part and connecting the two chambers and open at all times, and means for positively enlarging said by-pass each time the valve is operated and a passageway separate from said by-pass extending through said movable part and a valve for controlling the same.

2. A flush valve comprising a casing, a main valve therein, a movable part connected with said main valve which divides the casing into two chambers, a handle for operating the valve, a by-pass extending through said movable part and connecting the two chambers and open at all times, and means for positively enlarging said by-pass each time the valve is operated and a passageway separate from said by-pass extending through said movable part and a valve for controlling the same, said means disconnected from said handle but set into operation by the movement thereof.

3. A flush valve comprising a casing, a main valve therein, a piston in the casing connected with said main valve and dividing the casing into an upper and a lower chamber, a discharge passageway for the upper chamber, an auxiliary valve carried by said pistons controlling said discharge passageway, a handle for actuating said auxiliary valve, a by-pass extending through said piston and connecting the upper and lower chambers of the casing, and means actuated by said handle for enlarging said by-pass when the valve is operated.

4. A flush valve comprising a casing, a main valve therein, a piston in the casing connected with said main valve and dividing the casing into an upper and a lower chamber, a discharge passageway for the upper chamber, an auxiliary valve carried by said piston controlling said discharge passageway, a handle for actuating said auxiliary valve, a by-pass extending through said piston and connecting the upper and lower chambers of the casing, an actuating member controlled from the exterior of the casing for actuating said auxiliary valve, the movement of said auxiliary valve acting positively to enlarge said by-pass.

5. A flush valve comprising a casing, a main valve therein, a piston connected with said main valve, and dividing the casing into two chambers, a by-pass extending through said piston and connecting said chambers, a discharge passageway through said piston and separate controlling devices for said by-pass and passageway.

6. A flush valve comprising a casing, a piston valve in said casing, a passageway extending through said piston valve, said passageway provided with an enlargement intermediate its ends and an auxiliary valve in said enlargement for controlling said passageway, a by-pass extending through said valve having an enlarged portion and a contracted portion, a wall surrounding said contracted portion, a movable part in the enlarged portion of said by-pass having an enlarged body larger in cross section than the contracted portion and above the contracted portion and supported by said wall, and in operative relation with said auxiliary valve so as to be moved when the said auxiliary valve is moved.

Signed at Chicago county of Cook and State of Illinois, this seventh day of April, 1926.

WILLIAM E. SLOAN.